United States Patent
Bortz et al.

(10) Patent No.: US 10,454,968 B1
(45) Date of Patent: Oct. 22, 2019

(54) REGULAR EXPRESSION BASED CYBER FUZZING ATTACK PREVENTER

(71) Applicant: Rockwell Collins, Inc., Cedar Rapids, IA (US)

(72) Inventors: Mark A. Bortz, Robins, IA (US); David S. Hardin, Cedar Rapids, IA (US); James N. Potts, Cedar Rapids, IA (US); Konrad L. Slind, Richfield, MN (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 277 days.

(21) Appl. No.: 15/263,067

(22) Filed: Sep. 12, 2016

(51) Int. Cl.
*H04L 29/06* (2006.01)
*G06F 21/57* (2013.01)

(52) U.S. Cl.
CPC ........ *H04L 63/1441* (2013.01); *G06F 21/577* (2013.01); *H04L 63/1433* (2013.01); *G06F 2221/033* (2013.01)

(58) Field of Classification Search
CPC . H04L 63/1441; H04L 63/1433; G06F 21/52; G06F 21/54; G06F 21/577; G06F 11/487; G06F 11/3672; G06F 2221/033
USPC .................................................. 726/23
See application file for complete search history.

(56) References Cited

U.S. PATENT DOCUMENTS

| | | | | |
|---|---|---|---|---|
| 7,181,729 | B2 * | 2/2007 | Grundy | G06F 11/3608 714/E11.207 |
| 9,619,651 | B1 * | 4/2017 | Leavy | H04L 43/50 |
| 2002/0091512 | A1 * | 7/2002 | Karttunen | G10L 15/193 704/202 |
| 2009/0254970 | A1 * | 10/2009 | Agarwal | G06F 21/554 726/1 |
| 2012/0072968 | A1 * | 3/2012 | Wysopal | G06F 11/3612 726/1 |
| 2017/0046702 | A1 * | 2/2017 | Mitola, III | G06F 21/56 |

* cited by examiner

*Primary Examiner* — Ashokkumar B Patel
*Assistant Examiner* — William B Jones
(74) *Attorney, Agent, or Firm* — Suiter Swantz pc llo

(57) ABSTRACT

Testing a system against fuzzing attacks includes negating all regular expressions used in the corresponding language, and applying those negated regular expressions to a system interface. Only expressions definitively outside the scope of protocol specification implicate vulnerabilities to fuzzing attacks. The system detects fuzzing attacks by continuously monitoring packets of data and only passing through packets that conform to regular expressions of the language.

17 Claims, 9 Drawing Sheets

REGULAR EXPRESSION BASED CYBER FUZZING ATTACK PREVENTER

BACKGROUND

Computer system interfaces are subject to attack by miss-constructed packets in an effort to identify and exploit a coding error or vulnerability (a "fuzzing" attack). Fuzzing attacks are difficult or impossible for a system to detect or defend against.

Processes exist to determine the susceptibility of a system to a fuzzing attack. Such processes generally include supplying random inputs to the system, or random bit flipping of known good inputs. Such processes are inefficient and slow to test all possible fuzzing scenarios.

SUMMARY

In one aspect, embodiments of the inventive concepts disclosed herein are directed to a system and method for testing a system against fuzzing attacks by negating all regular expressions used in the corresponding language, and applying those negated regular expressions to the system interface. Only expressions definitively outside the scope of protocol specification implicate vulnerabilities to fuzzing attacks.

In a further aspect, the system detects fuzzing attacks by continuously monitoring packets of data for regular expressions. The system passes through packets of data that include regular expressions.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
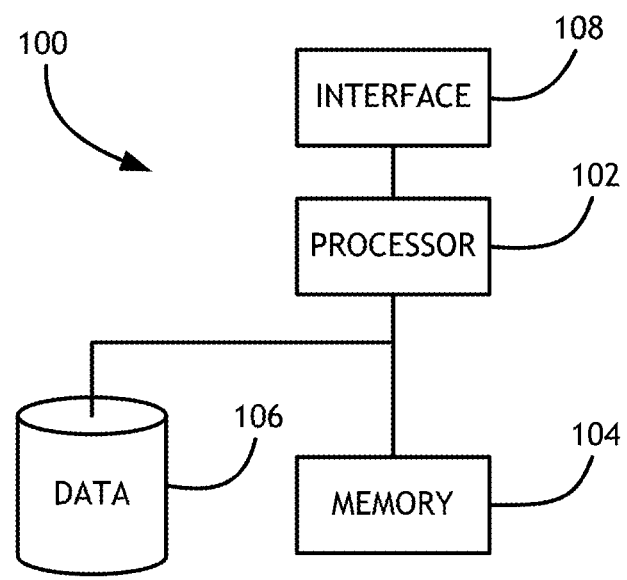
FIG. 1 shows a block diagram of an exemplary embodiment of a computer system for implementing the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to systems and methods for identifying inputs corresponding to a fuzzing attack, testing a system with respect to those inputs, and identifying and filtering out those inputs.

Referring to FIG. 1, a block diagram of an exemplary embodiment of a computer system 100 for implementing the inventive concepts disclosed herein is shown. In at least one embodiment, the system 100 includes a processor 102, a data storage element 106 connected to the processor 102 for storing protocol specifications, a memory 104 connected to the processor 102 for storing processor executable code, and an external interface 108 connected to the processor 102 for receiving a data stream. The external interface 108 may comprise a radio frequency antenna or a physical connection such as Ethernet, RS232, RS429, Mil-Std-1553, or any other similar data connection.

In some embodiments, the system 100 generates a set of inputs for testing a computer or computer program against fuzzing attacks. The processor 102 identifies discrete command inputs from a protocol specification in the data storage element 106. The processor 102 applies those command inputs to a separate system or computer program to identify inputs that may cause faults. The computer program may also be executing on the processor 102.

In some embodiments, the system 100 identifies fuzzing attacks by monitoring inputs received via the external interface 108. The processor 102 flags any inputs received via the external interface 108 that match an element in a set of command inputs stored in the data storage element 106. In some embodiments, the processor 102 identifies inputs corresponding to a fuzzing attack and filters out those inputs. Alternatively, the processor 102 identifies and passes through only inputs that match regular expressions.

Figure 2:
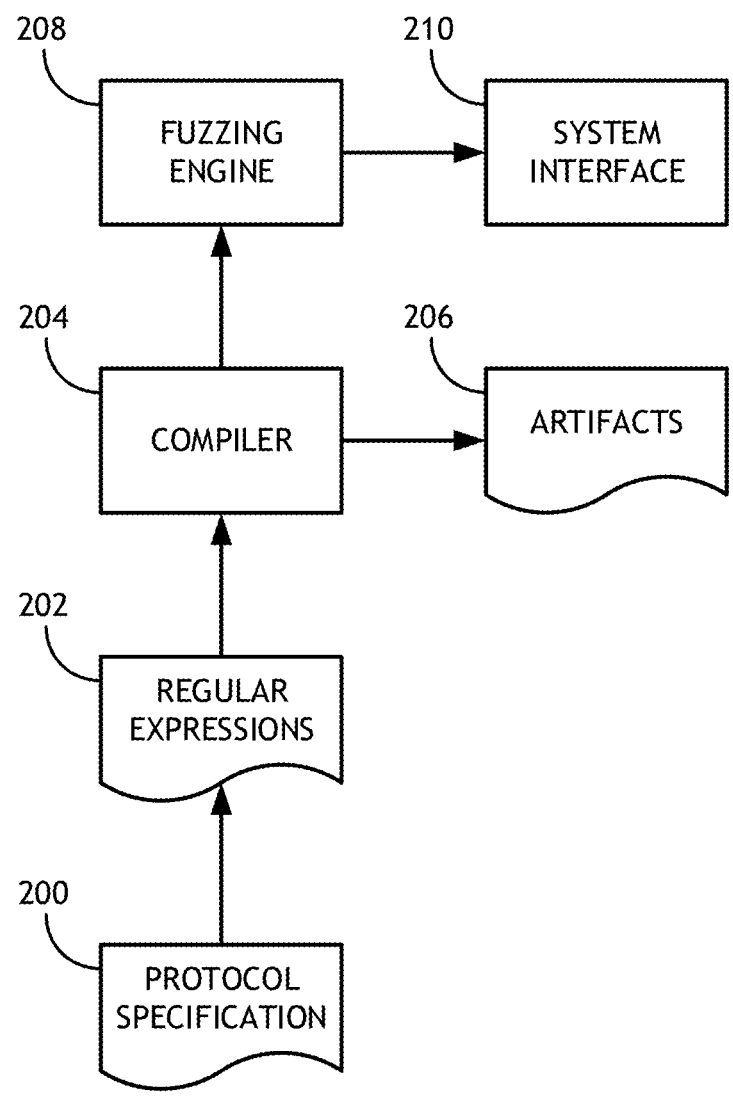
FIG. 2 shows a block diagram of an exemplary embodiment for identifying fuzzing inputs according to the inventive concepts disclosed herein.

Referring to FIG. 2, a block diagram of an exemplary embodiment for generating fuzzing inputs according to the inventive concepts disclosed herein is shown. A data set defining a protocol specification 200 is converted to a regular expression set 202.

Regular expressions comprise sets of character strings (written using a compact syntax) that define all valid possible input strings. Regular expressions are distinct from formal mathematical notation. Many languages include regular expression capabilities either natively or via standard libraries.

Languages supporting regular expressions may be domain-specific and configured to express portable, high-assurance guard logic, as well as protocol specification 200 and proof of guard properties. Toolchains for languages supporting regular expressions may generate source code from programs in such language and also provide formal specification and automated verification support. In one embodiment, guard programs and specifications are translated to higher order logic, and deductively transformed to a form suitable for a satisfiability modulo theory (SMT) decision procedure for recursive functions over tree-structured data. Consequently, difficult program properties can be proved automatically.

Some regular expression languages include a formally verified compiler to convert regular expressions to deterministic finite-state automata (DFAs), using a derivatives approach. The mathematical correctness of the compilation is verified via theorem proving.

Each regular expression in the regular expression set 202 is negated by a language compiler 204 and compiled into machine readable versions of the negated regular expression. Compiling may produce verification artifacts 206 that can be used to confirm the validity of the compilation.

The compiled negated regular expressions are delivered as input to a fuzzing engine 208. The fuzzing engine 208 generates input, where the input matches the compiled negated regular expressions, for a system interface 210 being tested. Embodiments reduce the time to test a system interface 210 by only testing packets that do not conform to the protocol specification 200; packets that conform to the protocol specification 200 in some way do not pose a fuzzing vulnerability.

Figure 3:
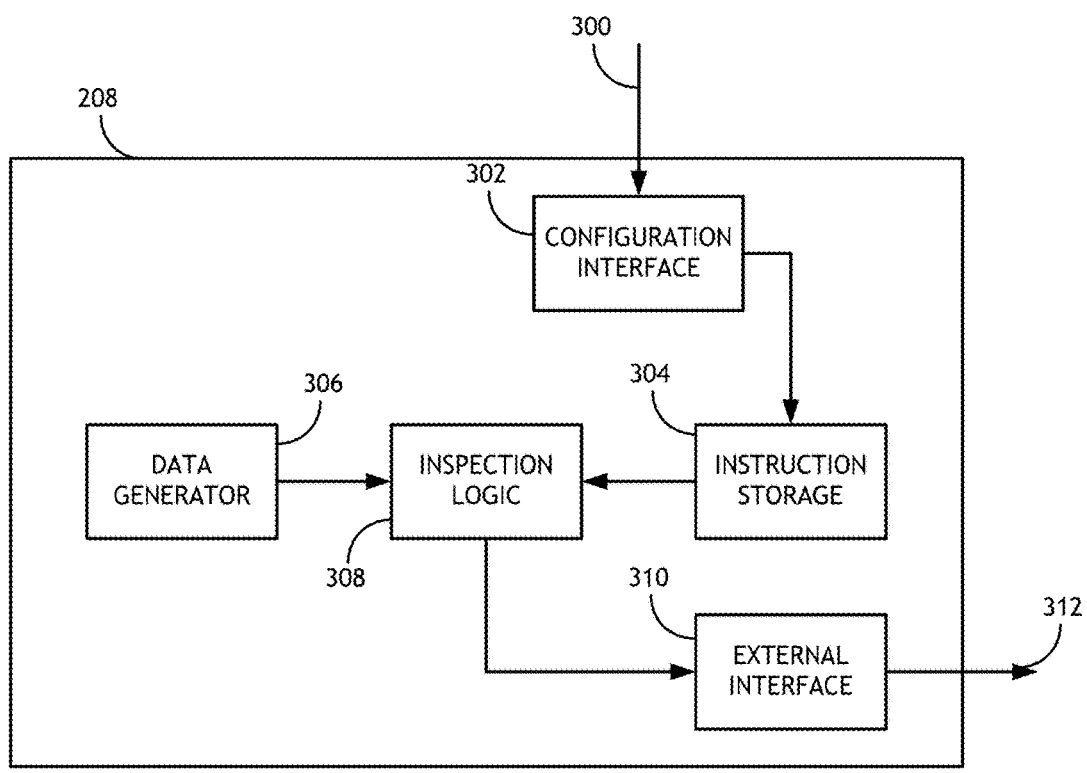
FIG. 3 shows a block diagram of a processing element according to the inventive concepts disclosed herein.

Referring to FIG. 3, a block diagram of a fuzzing engine 208 according to the inventive concepts disclosed herein is shown. In some embodiments, the fuzzing engine 208 may be embodied in hardware or software executing on a general purpose processor. The fuzzing engine 208 receives compiled negated regular expressions 300 as an input; the compiled negated regular expressions 300 delivered to a configuration interface 302. The configuration interface 302 is in data communication with an instruction storage 304. The inspection logic element 308 is also in data communication with a data generator 306 and the instruction storage 304. The inspection logic 308 delivers a data stream to an external interface 310 that sends the data stream 312 to a system interface being tested for fuzzing attack vulnerability.

In some embodiments, the inspection logic element 308 incorporates compiled negated regular expressions 300 via the instruction storage 304 and data from the data generator 306 to produce the data stream.

Figure 4:
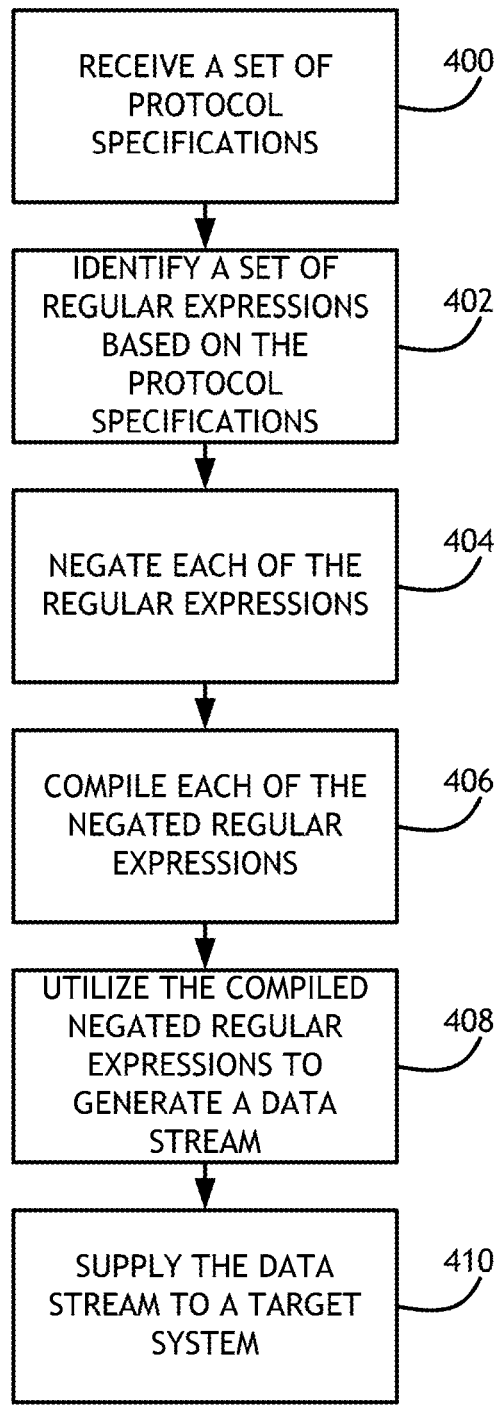
FIG. 4 shows a flowchart of a method for testing a computer system against fuzzing attacks according to the inventive concepts disclosed herein.

Referring to FIG. 4, a flowchart of a method for testing a computer system against fuzzing attacks according to the inventive concepts disclosed herein is shown. A human analyst or computer processor receives 400 a protocol specification and identifies 402 a set of source regular expressions for the protocol specification. Each source regular expression in the set of regular expressions is negated 404 and compiled 406 into a machine readable format.

The processor utilizes 408 the compiled regular expressions to generate a data stream of inputs to a target system to be tested. The data stream is then supplied 410 to the target system to identify if a target system vulnerability exists.

Figure 5:
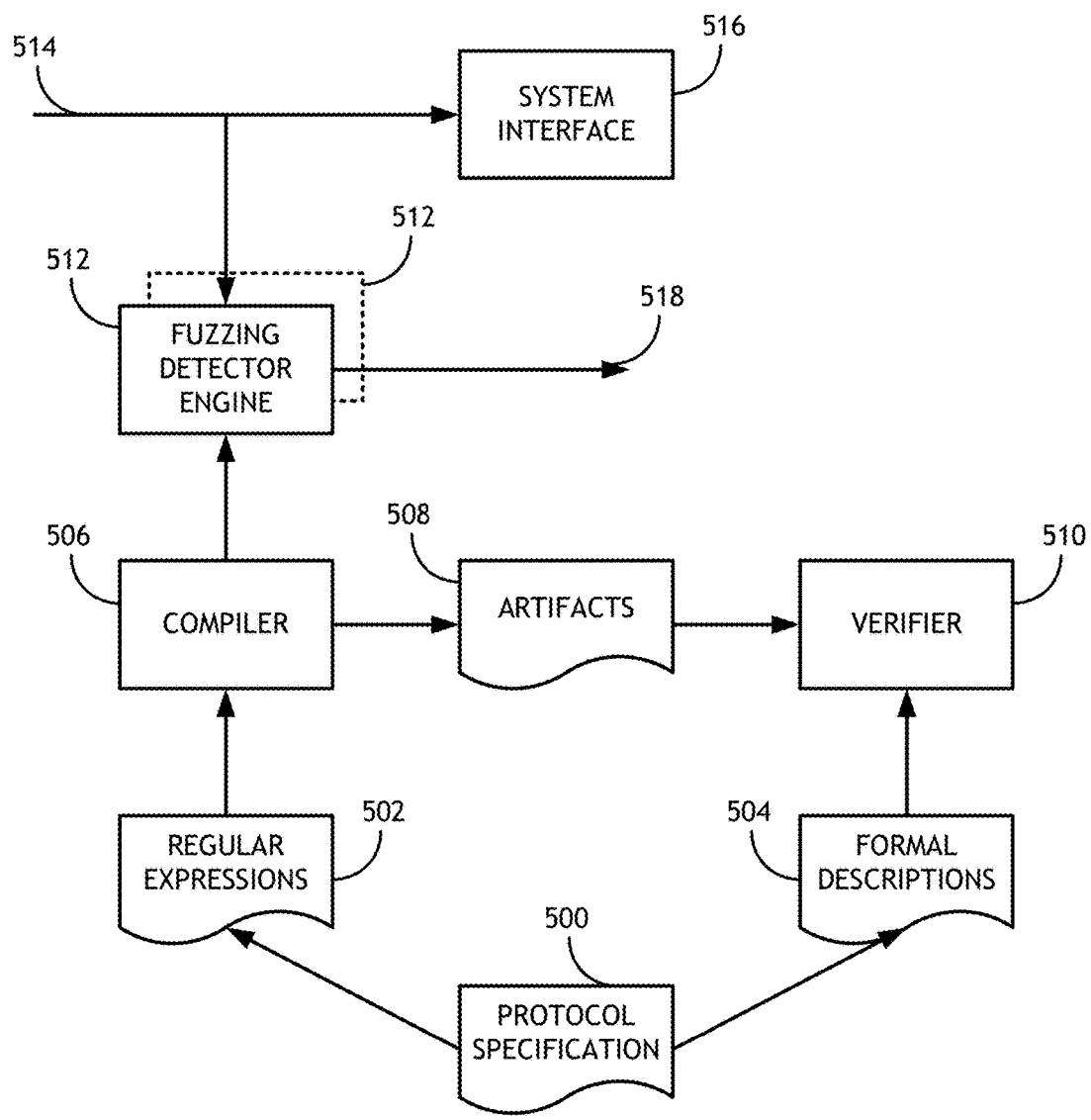
FIG. 5 shows a block diagram of an exemplary embodiment for detecting fuzzing attacks according the inventive concepts disclosed herein.

Referring to FIG. 5, a block diagram of an exemplary embodiment for identifying fuzzing attacks according to the inventive concepts disclosed herein is shown. A data set defining a protocol specification 500 is converted to a regular expression set 502 and a corresponding formal description set 504 comprising formal mathematical descriptions of each regular expression in the regular expression set 502.

Each regular expression in the regular expression set 502 is compiled into machine readable versions by a language compiler 506. In some embodiments, the compiler 506 is formally verified by a theorem prover 510 based on the formal description 504; for example, compiling may produce verification artifacts 508 that may be compared to corresponding formal mathematical descriptions in the formal description set 504 to initially validate the compiler 506.

The compiled regular expressions are delivered as input to a fuzzing detection engine 512. The fuzzing detection engine 512 also receives an external data stream 514 intended as input to a system interface 516. The fuzzing detection engine 512 compares packets from the external data stream 514 to the compiled regular expressions; producing an analysis 518 or alert whenever a portion of the external data stream 514 does not conform to a regular expression.

Multiple fuzzing detection engines 512 may be implemented in parallel to analyze multiple external data streams 514 concurrently or multiple packets in a single data stream 514 concurrently.

Figure 6:
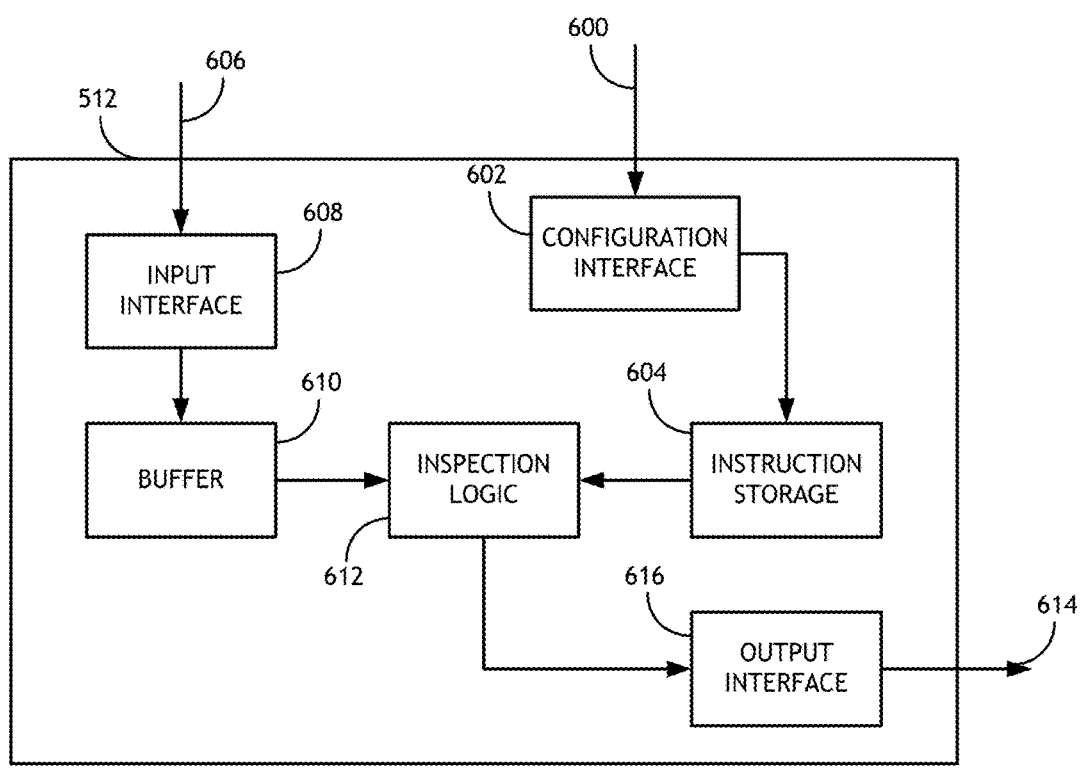
FIG. 6 shows a block diagram of a processing element according to the inventive concepts disclosed herein.

Referring to FIG. 6, a block diagram of a processing element according to the inventive concepts disclosed herein is shown. In some embodiments, the fuzzing detection engine 512 may be embodied in hardware or software executing on a general purpose processor. The fuzzing detection engine 512 receives compiled regular expressions 600 as an input; the compiled regular expressions 600 delivered to a configuration interface 602.

The fuzzing detection engine 512 also includes an input interface 608 to receive an external data stream 606. Packets from the external data stream 606 are stored in a buffer 610.

The configuration interface 602 is in data communication with an instruction storage 604. An inspection logic element 612 is also in data communication with the buffer 610 and the instruction storage 604. The inspection logic 612 compares packets from the buffer 610 to compiled regular expressions from the instruction storage 604. In some embodiments, the inspection logic 612 delivers inspected packets to output interface 616 that sends the data stream 614 to the receiving system.

Figure 7:
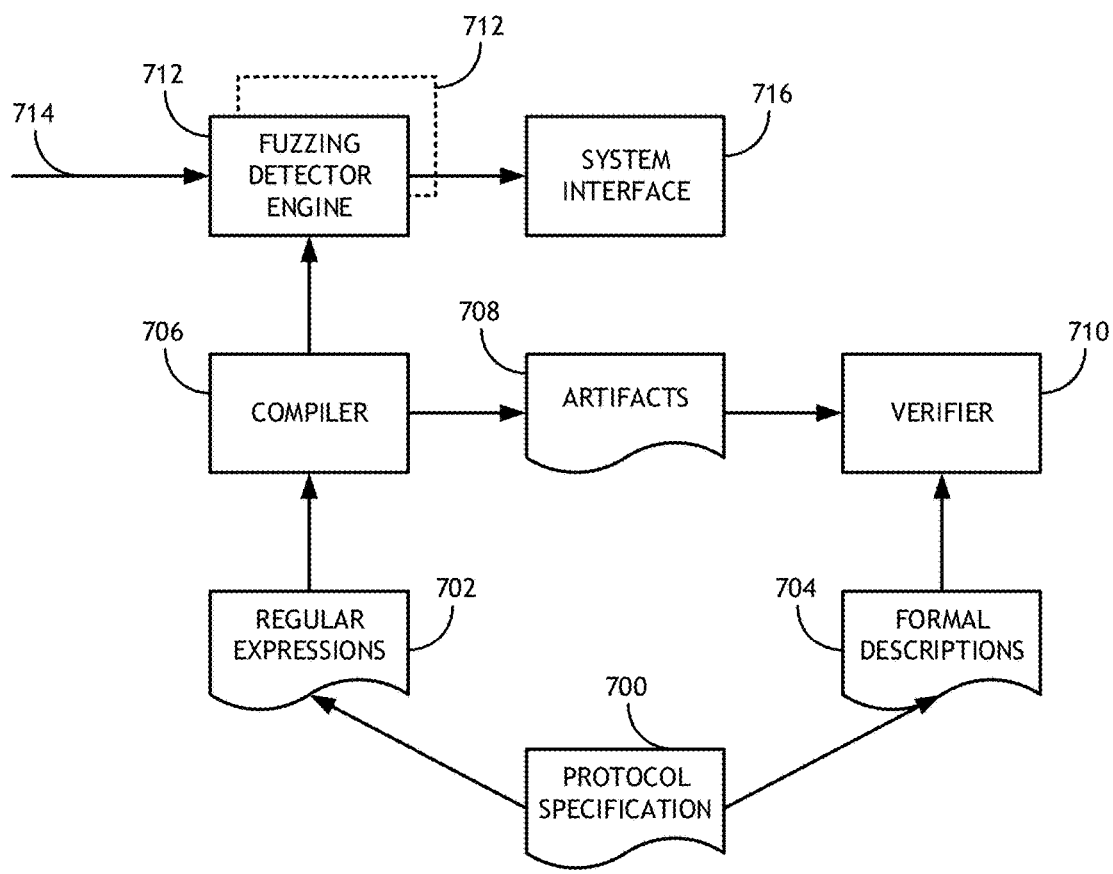
FIG. 7 shows a block diagram of an exemplary embodiment for preventing fuzzing attacks according to the inventive concepts disclosed herein.

Referring to FIG. 7, a block diagram of an exemplary embodiment for preventing fuzzing attacks according to the inventive concepts disclosed herein is shown. A data set defining a protocol specification 700 is converted to a regular expression set 702 and a corresponding formal description set 704 comprising formal mathematical descriptions of each regular expression in the regular expression set 702.

Each regular expression in the regular expression set 702 is compiled by a language compiler 706 into machine readable versions of the regular expression. Compiling may produce verification artifacts 708. The verification artifacts 708 for each compiled regular expression are compared to corresponding formal mathematical descriptions in the formal description set 704 by a verifier 710 to validate the compilation of the corresponding regular expression.

The compiled regular expressions are delivered as input to a fuzzing detection engine 712. The fuzzing detection engine 712 also receives an external data stream 714 for a system interface 716. The fuzzing detection engine 712 compares packets from the external data stream 714 to the compiled regular expressions. As the fuzzing detection engine 712 confirms packets that match compiled regular expressions, the fuzzing detection engine 712 forwards the external data stream 714 to the system interface 716.

Figure 8:
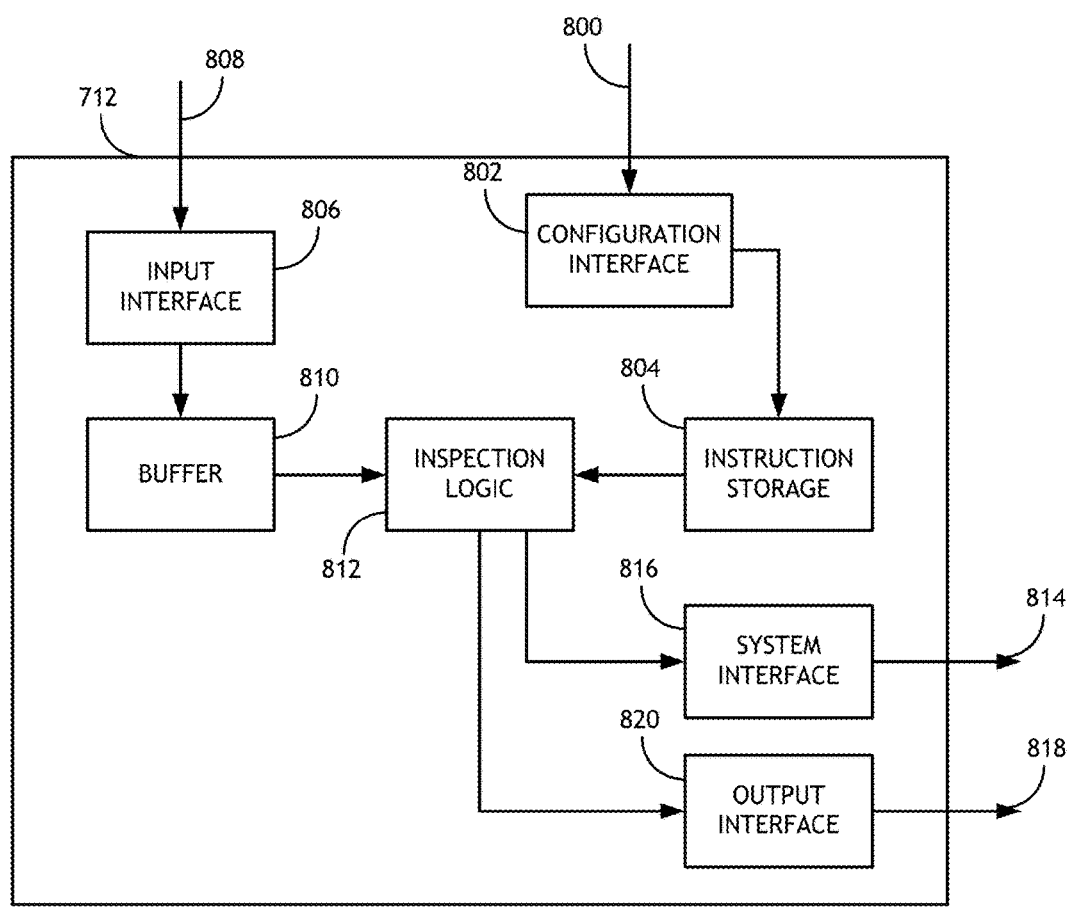
FIG. 8 shows a block diagram of a processing element according to the inventive concepts disclosed herein.

Referring to FIG. 8, a block diagram of a processing element according to the inventive concepts disclosed herein is shown. In some embodiments, the fuzzing detection engine 712 may be embodied in hardware or software executing on a general purpose processor. The fuzzing detection engine 712 receives compiled regular expressions 800 as an input; the compiled regular expressions 800 delivered to a configuration interface 802.

The fuzzing detection engine 712 also includes an input interface 806 to receive an external data stream 808. Packets from the external data stream 808 are stored in a buffer 810.

The configuration interface 802 is in data communication with an instruction storage 804. An inspection logic element 812 is also in data communication with the buffer 810 and the instruction storage 804. The inspection logic 812 compares packets from the buffer 810 to compiled regular expressions from the instruction storage 804. Where the inspection logic 812 determines which packets from the buffer 810 match compiled regular expressions, the safe packets 818 are passed through an output interface 820. In some embodiments, the inspection logic 812 also delivers an analysis 814 to a connected output interface 820. The analysis 814 may comprise an indication of packets that did not match compiled regular expressions, percentage of packets that did not match compiled regular expressions, or other indicia of a fuzzing attack.

Figure 9:
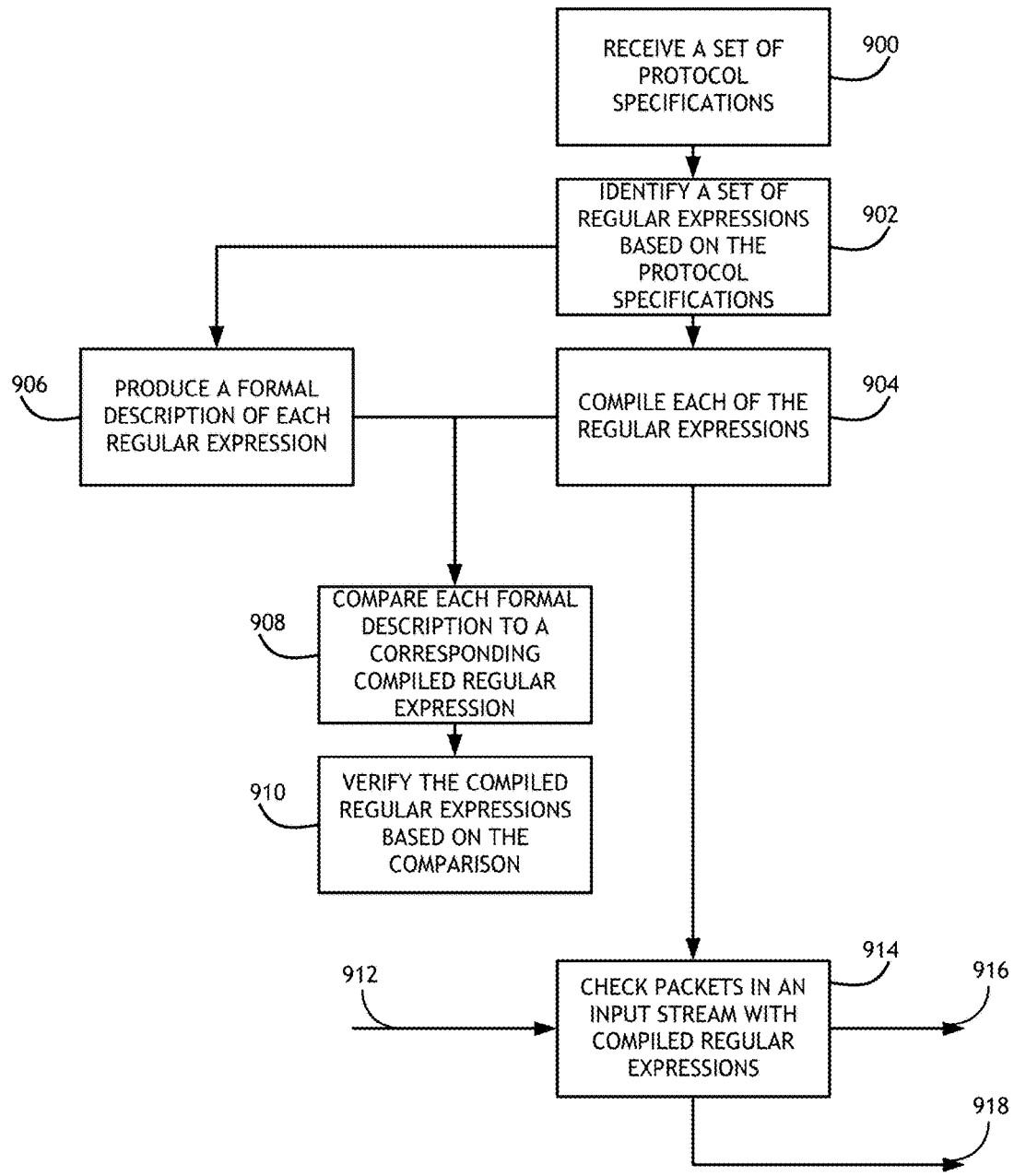
FIG. 9 shows a flowchart of a method for detecting and defending a computer system against fuzzing attacks according to the inventive concepts disclosed herein.

Referring to FIG. 9, a flowchart of a method for detecting and defending a computer system against fuzzing attacks according to the inventive concepts disclosed herein is shown. A human analyst or computer processor receives 900 a protocol specification and identifies 902 a set of regular expressions that describes the protocol specification. Each regular expression in the set of regular expressions is compiled 904.

The compiler 904 also produces 906 a formal mathematical description of each regular expression. The formal mathematical description of each regular expression is compared 908 to a corresponding compiled regular expression to verify 910 the compiled regular expressions.

The processor receives a data stream 912 and detects 914 packets in the data stream 912 that match compiled regular expressions 904. In some embodiments, the processor produces an analysis to a system interface 918 of the data stream 912 indicating the existence of packets that do not match compiled regular expressions 904 while packets matching compiled regular expressions 904 are directed to an output interface 916.

In some embodiments, the data stream 912 is analyzed by detecting 914 compiled regular expressions and passing through the data stream 912 where compiled regular expressions are detected and stopping any other packets.

Embodiments of the incentive concepts disclosed herein protect a target system from fuzzing attacks with high assurance. The ability to mathematically analyze the target system ensures that all valid packets could be received and that only packets that violated the protocol are blocked.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages. The form herein before described being merely an explanatory embodiment thereof, it is the intention of the following claims to encompass and include such changes.

What is claimed is:
1. A method for identifying a fuzzing attack in a system interface comprising:
    accessing a set of compiled regular expressions indicative of a protocol specification for a system interface;
    translating and transforming the protocol specification into a higher order logic form suitable for satisfiability modulo theory (SMT) procedure for recursive functions over tree-structured data;
    producing a formal mathematical description of each source regular expression;
    compiling each source regular expression such that each compiled regular expression corresponds to a source regular expression;
    identifying a verification artifact associated with each compiled regular expression;
    verifying each compiled regular expression via comparison of the identified verification artifacts to a corresponding formal mathematical description of a corresponding source regular expression;
    producing a formal mathematical description of each regular expression;

supplying the formal mathematical description and translated protocol specification to a theorem proving tool;
verifying a compiler with the theorem proving tool;
receiving a data stream comprising a plurality of data packets;
comparing each of the plurality of data packets to the set of compiled regular expressions;
determining whether at least one data packet mismatches the protocol specification for the system interface of the set of compiled regular expressions; and
generating an alert indicative of the data packet mismatching the protocol specification for the system interface.

2. The method of claim 1, wherein each of the compiled regular expressions correspond to a negated source regular expression, further comprising:
applying each of the compiled regular expressions to the system interface;
detecting at least one fuzzing vulnerability based on one or more of the applied compiled regular expressions; and
producing an analysis of the at least one fuzzing vulnerability.

3. The method of claim 2, further comprising:
producing a valid data stream for the system interface;
incorporating one or more of the compiled regular expressions to the valid data stream to produce one or more test packets; and
sending the one or more test data packets to the system interface.

4. The method of claim 1, further comprising blocking the data packet not corresponding to the protocol specification for the system interface from reaching the system interface.

5. A computer apparatus comprising:
at least one processor in data communication with a memory storing processor executable code for electronically configuring the at least one processor to:
access a plurality of compiled regular expressions corresponding to a plurality of sou rce regular expressions;
produce a formal mathematical description of each source regular expression by translating and transforming each source regular expression to higher order logic suitable satisfiability modulo theory (SMT) decision procedure for recursive functions over tree-structured data;
compile each source regular expression such that each compiled regular expression corresponds to a source regular expression;
identify a verification artifact associated with each compiled regular expression;
verify each compiled regular expression via comparison of the identified verification artifacts to a corresponding formal mathematical description of a corresponding source regular expression;
receive a data stream comprising data packets;
compare a data packet from the data stream to one or more of the compiled regular expressions; and
determine whether at least one data packet mismatches the protocol specification for the system interface of the set of compiled regular expressions; and
generate an alert indicative of the data packet mismatching the protocol specification for the system interface.

6. The computer apparatus of claim 5, wherein the processor executable code further electronically configures the at least one processor to:
identify at least one data packet not conforming to at least one compiled regular expression;
block the at least one data packet from a system interface.

7. The computer apparatus of claim 5, wherein the processor executable code further electronically configures the at least one processor to:
access a formal mathematical description corresponding to each compiled regular expression based on a protocol specification; and
compare each formal mathematical description to a corresponding compiled regular expression.

8. The computer apparatus of claim 5, wherein the processor executable code further electronically configures the at least one processor to formally verify a compiler via a theorem proving tool.

9. The computer apparatus of claim 5, further comprising a system interface connected to the inspection logic, wherein the inspection logic is further configured to pass through all packets comprising compiled regular expressions to the system interface.

10. The computer apparatus of claim 5, further comprising a system interface connected to a fuzzing detector engine, wherein the fuzzing detector engine is further configured to:
receive a data stream comprising a plurality of data packets;
compare one or more data packets in the plurality of data packets to the plurality of compiled regular expressions; and
block the at least one data packet from the system interface.

11. The computer apparatus of claim 5, further comprising a second fuzzing detector engine connected to the compiler configured to:
receive the data stream;
compare a set of data packets in the plurality of data packets to the plurality of compiled regular expressions; and
block the at least one data packet from the system interface,
wherein:
the fuzzing detector engine comprises a first fuzzing detector engine; and
the first fuzzing detector engine and the second fuzzing detector engine operate in parallel on different data packets in the plurality of data packets.

12. A apparatus comprising:
a system interface;
a compiler configured to generate a plurality of compiled regular expressions representative of a plurality of negated source regular expressions, translate and transform the protocol specification into higher order logic a form suitable for satisfiability modulo theory procedure for recursive functions over tree-structured data;
a verifier connected to the compiler, the verifier configured to compare each of the compiled regular expressions to a formal mathematical description and the translated protocol specification;
a memory connected to the compiler configured to store each of the plurality of compiled regular expressions; and
a fuzzing engine connected to the memory and configured to identify compiled negated regular expressions that do not conform to a protocol specification, apply each of the identified compiled negated regular expressions to the system interface, and generate a set of fuzzing data packets; wherein the engine determines whether at least one data packet mismatches the protocol specification for the system interface of the set of compiled regular expressions; and generates alerts indicative of the data packet mismatching the protocol specification for the system interface.

13. The apparatus of claim 12, wherein the fuzzing engine comprises:
an external interface coupled with the system interface;
a configuration interface configured to receive the compiled regular expressions;
an instruction storage connected to the configuration interface that stores the compiled regular expressions;
a data generator configured to produce data for the system interface; and
inspection logic connected to the instruction storage and the data generator, the inspection logic configured to receive data from the data generator and to incorporate one or more compiled regular expressions from the instruction storage to produce the set of fuzzing data packets, and send one or more fuzzing data packets to the system interface via the external interface.

14. The apparatus of claim 13, wherein the fuzzing engine comprises:
an input interface configured to receive a data stream;
a buffer connected to the input interface and the inspection logic to store packets from the data stream; and
an output interface connected to the inspection logic, wherein the inspection logic:
receives one or more data packets from the buffer and compares each of the one or more data packets to one or more compiled regular expressions from the instruction storage to identify data packets including any of the compiled regular expressions;
produces an alert based on the data packet lacking any of the compiled regular expressions; and
sends the alert to the output interface.

15. The apparatus of claim 14, wherein the fuzzing engine is further configured to block the data packet including the compiled regular expressions from the system interface.

16. The apparatus of claim 13, wherein:
a fuzzing engine is further configured to identify a set of compiled regular expressions that represent a fuzzing vulnerability; and
the inspection logic is further configured to block any data packet including any of the set of compiled regular expressions that represent a fuzzing vulnerability.

17. The apparatus of claim 12, further comprising a theorem proving tool configured to formally verify the compiler.

* * * * *